US006687972B1

(12) United States Patent
Governo

(10) Patent No.: US 6,687,972 B1
(45) Date of Patent: Feb. 10, 2004

(54) METHOD OF FORMING A PORTABLE CUTTING APPARATUS

(75) Inventor: Anthony J. Governo, Buena Park, CA (US)

(73) Assignee: MK Diamond Products, Inc., Torrance, CA (US)

( * ) Notice: Subject to any disclaimer, the term of this patent is extended or adjusted under 35 U.S.C. 154(b) by 0 days.

(21) Appl. No.: 09/507,085

(22) Filed: Feb. 18, 2000

(51) Int. Cl.[7] .......... B23P 19/02
(52) U.S. Cl. .......... 29/525; 125/13.03
(58) Field of Search .......... 29/525, 525.01, 29/527.5, 527.6, 897.31; 248/678, 676, 298.1, 346.01, 346.03; 125/3, 13.03, 15, 13.01, 14; 403/373, 374.1, 374.2, 374.3, 374.4; 83/490, 435.11

(56) References Cited

U.S. PATENT DOCUMENTS

| | | | | |
|---|---|---|---|---|
| 2,101,707 A | * | 12/1937 | Ewing | 29/525 |
| 2,716,402 A | * | 8/1955 | Harrison, Sr. et al. | 125/13.03 |
| 3,283,402 A | * | 11/1966 | Larson | 29/525 |
| 3,311,103 A | * | 3/1967 | Simson | 125/13.03 |
| 3,680,897 A | * | 8/1972 | Linthout | 29/525 |
| 4,041,928 A | | 8/1977 | Robinson | |
| 4,068,648 A | | 1/1978 | Erdman | |
| 4,280,472 A | | 7/1981 | Cochran | |
| 4,446,845 A | | 5/1984 | Harding | |
| 4,577,613 A | | 3/1986 | Porsfeld | |
| 4,889,329 A | * | 12/1989 | Smith, Jr. | 269/287 |
| 5,127,391 A | | 7/1992 | O'Keefe | |
| 5,172,680 A | | 12/1992 | Swan | |
| 5,437,319 A | * | 8/1995 | Garuglieri | 83/574 |
| 5,517,744 A | * | 5/1996 | Moser et al. | 29/525 |
| 5,676,124 A | * | 10/1997 | Lee | 125/13.03 |
| 6,047,871 A | | 4/2000 | Chen | |
| 6,119,676 A | | 9/2000 | Greenland | |
| 6,272,961 B1 | * | 8/2001 | Lee | 125/13.03 |
| D451,109 S | | 11/2001 | Governo et al. | |

OTHER PUBLICATIONS

Photograph showing prior art saw.

* cited by examiner

*Primary Examiner*—Gregory Vidovich
*Assistant Examiner*—Jermie E. Cozart
(74) *Attorney, Agent, or Firm*—McAndrews, Held & Malloy, Ltd.

(57) ABSTRACT

The cutting apparatus of the present invention includes a frame with first and second side members that lie parallel to one another. It also includes two or more cross-members that connect the first and second side members together as well as a cantilever member that lies mounted to one of the other members and extends outwardly of that other member. A tray movably mounted on the frame holds an object for cutting; and a motor and block assembly mounted to the cantilever member cuts the object. The method of forming this apparatus includes forming openings in the side members and inserting end portions of the cross-members into the opening to form a frame in which the cross-members are parallel to each other and perpendicular to the side members.

5 Claims, 6 Drawing Sheets

FIG. 1
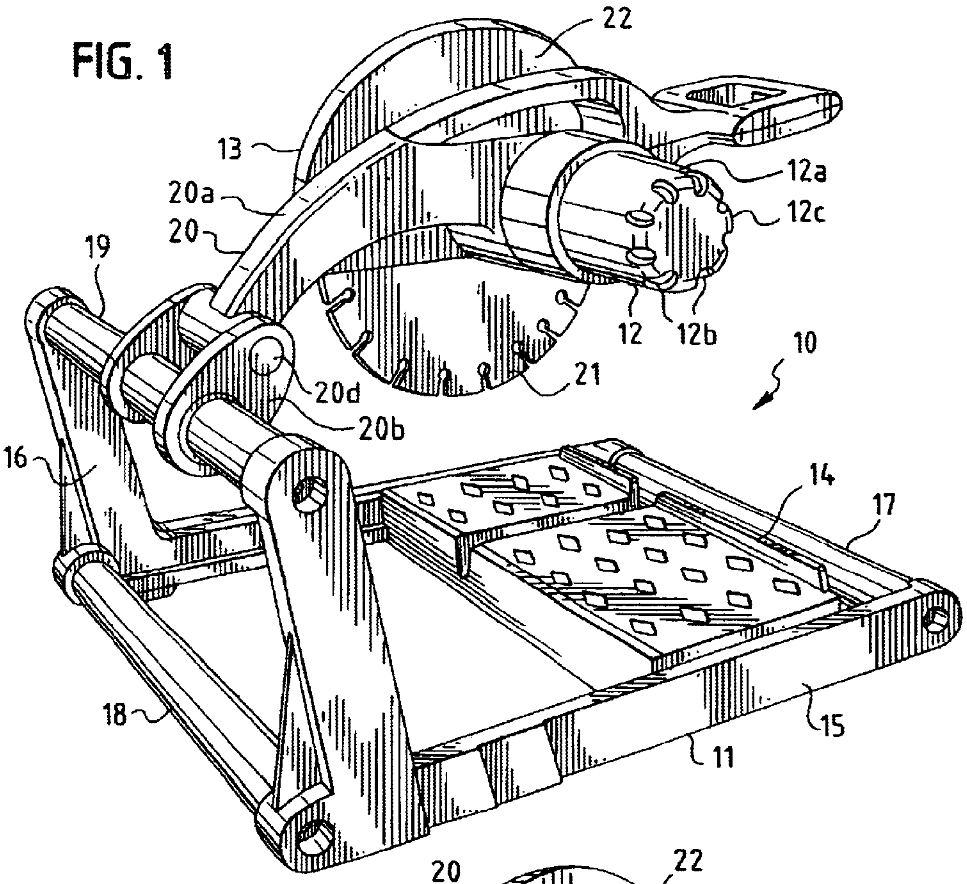
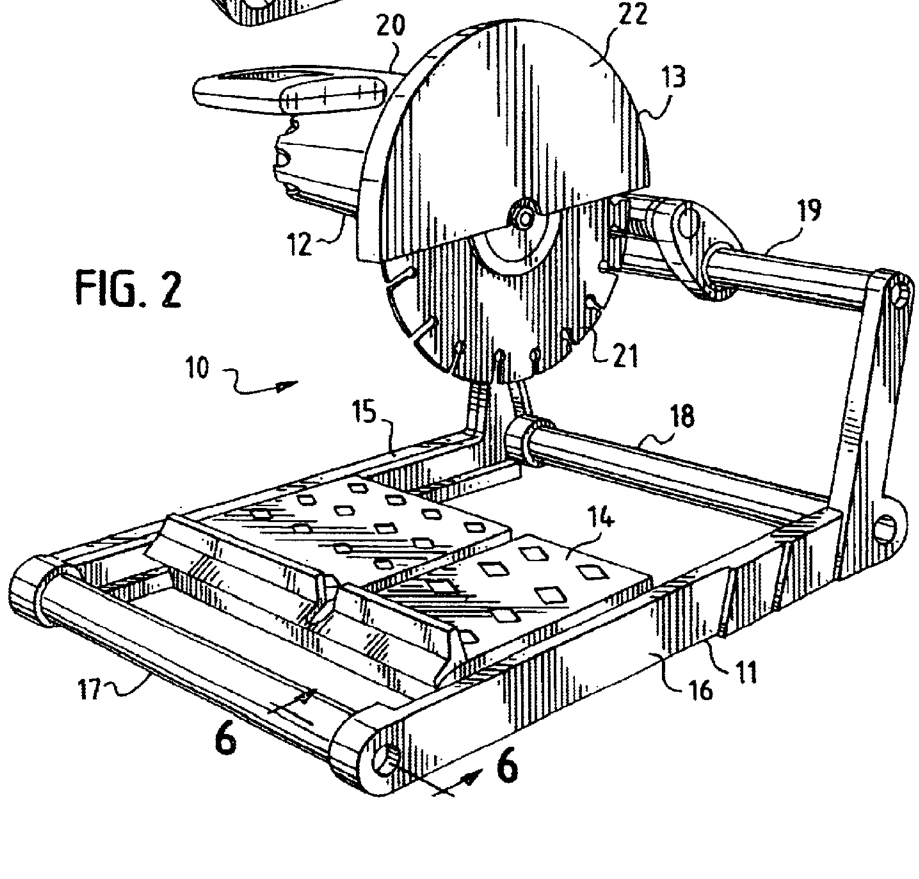
FIG. 2

FIG. 10
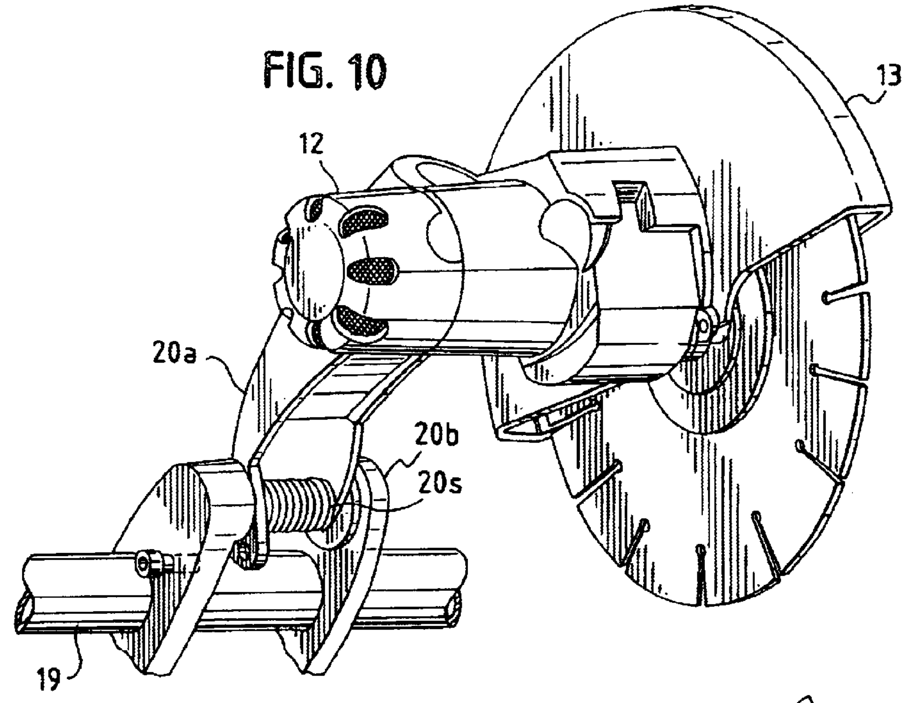
FIG. 12
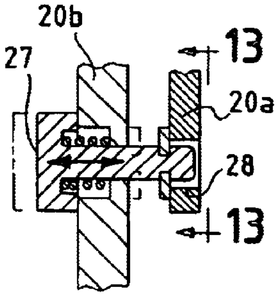
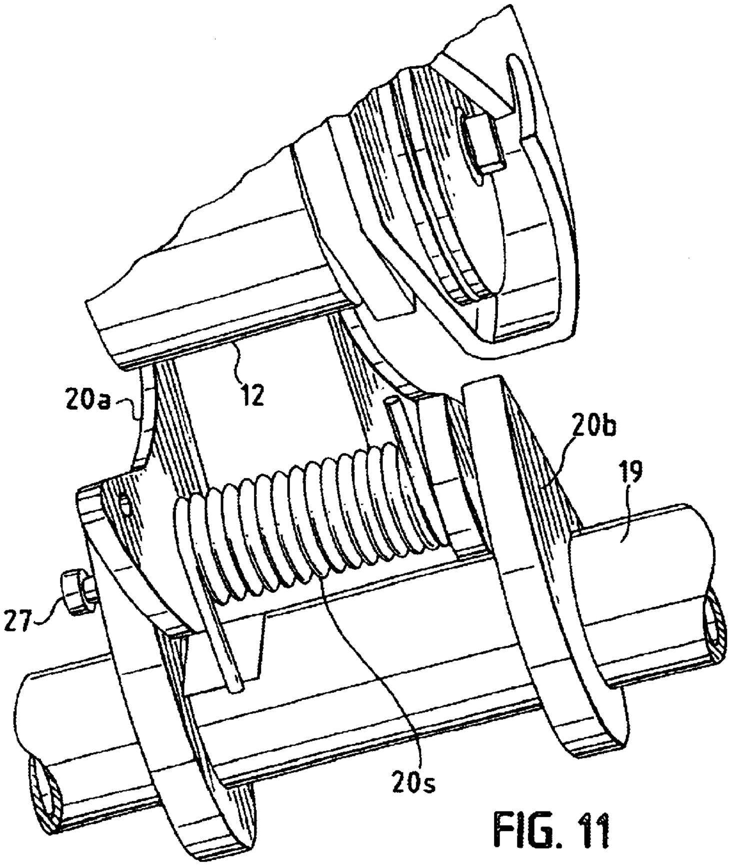
FIG. 11
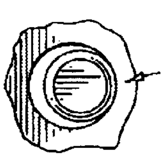
FIG. 13

METHOD OF FORMING A PORTABLE CUTTING APPARATUS

BACKGROUND OF THE INVENTION

1. Field of the Invention

The present invention relates to portable saws and more particularly to portable saws for "dry cutting" masonry. Although the present invention finds particular utility in masonry cutting, it may also provide similar cutting functions in a variety of other applications.

2. Description of the Prior Art

A variety of building materials such as concrete, masonry, stone and tile require cutting at building sites. These sites continually change as work progresses. Also, these sites typically fill with dust, moisture and other more hazardous and corrosive substances.

Accordingly, the machinery, and more specifically the cutting saws used at these sites should have a light construction for portability. The saws should have a simple construction to avoid malfunction; and they should have a durable construction that avoids wear and withstands dust, moisture and other harmful substances. Also, they should cut precisely, quickly and effectively.

The frame of such a saw should have a rigid construction so that the saw maintains parallelism between the path of travel of the object that the saw cuts and the cutting line of the blade doing the cutting. If the frame-cannot maintain this parallelism, the forces generated in the interaction between the blade and the object increase, resulting in increased loading on the motor and uneven wear on the blade.

The cutting saw of the present invention meets all of the requirements outlined above. It is a simple construction that minimizes the expense of fabrication and assembly. It is lightweight and highly portable; it withstands the elements; it has a rigid frame; and it provides precise and effective cutting in dry and dusty conditions.

SUMMARY OF THE INVENTION

In accordance with one embodiment of this invention, a portable cutting apparatus includes a frame with first and second side members that lie substantially parallel to each other. Two or more cross-members connect the first and second side members together while a cantilever member lies mounted on one of the cross-members and extends outwardly of that cross-member. A tray movably mounted on the frame holds an object for cutting; and a motor and blade assembly mounted on the cantilever member cuts the object. The method of forming this apparatus includes forming openings in the side members and inserting end portions of the cross-members into the opening to form a frame in which the cross-members are parallel to each other and perpendicular to the side members.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a perspective view of the portable cutting apparatus of the present invention;

FIG. 2 is another perspective view of the portable cutting apparatus;

FIG. 10 is a perspective view of a cantilever member and the motor and blade assembly that is supports;

FIG. 11 is a partial and enlarged perspective view of a joint in the cantilever member;

FIG. 12 is a sectional view showing a pin for locking an articulated cantilever member used in the cutting apparatus of the present invention; and FIG. 13 is a sectional view taken along line 13—13 in FIG. 12.

Figure 3:
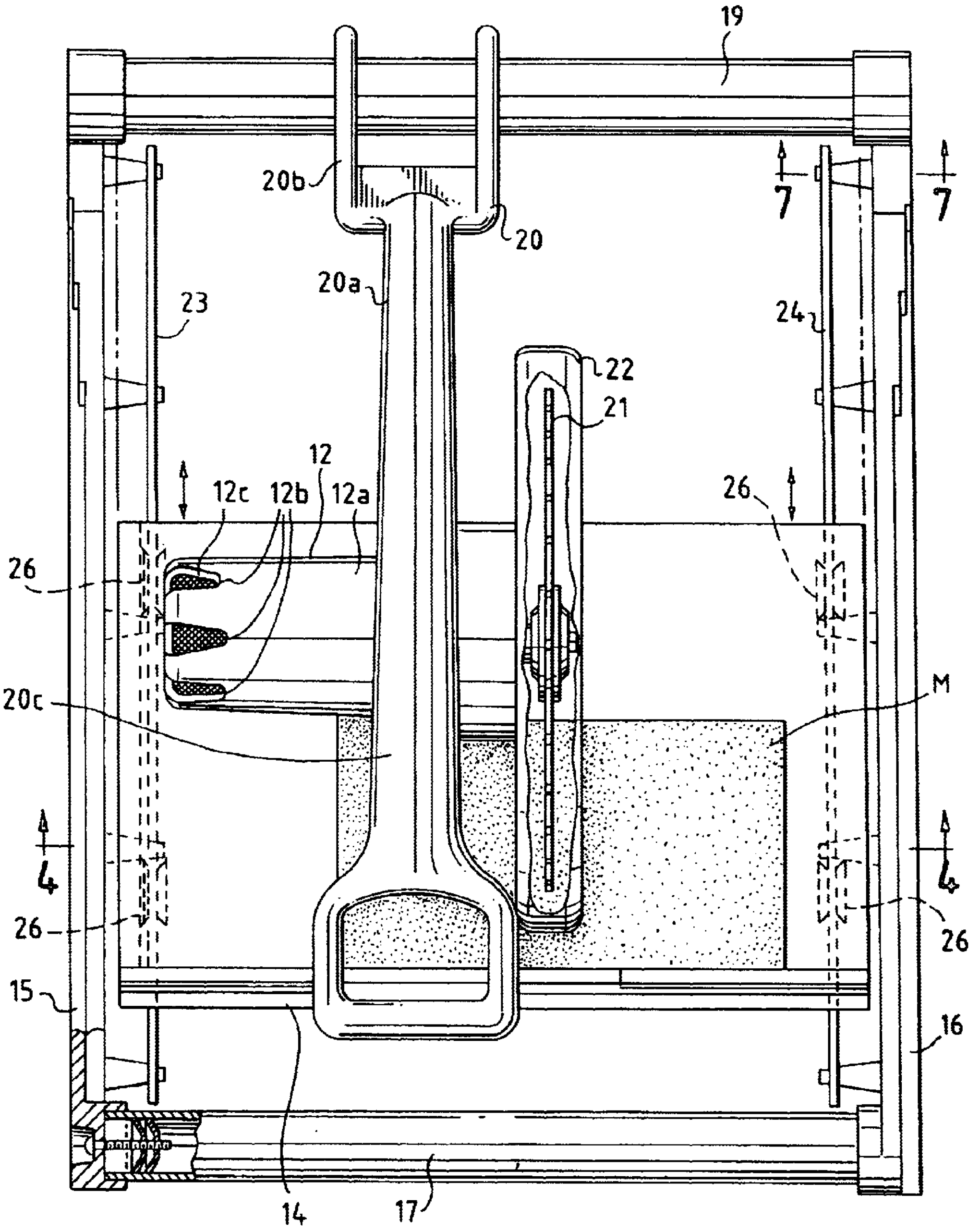
FIG. 3 is a top plan view of the portable cutting apparatus.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details which are not necessary for an understanding of the present invention such as conventional details of fabrication and assembly.

DETAILED DESCRIPTION OF THE DRAWINGS

Turning now to the drawings and referring specifically to FIGS. 1 and 2, the portable cutting apparatus 10 generally includes a frame 11, a motor 12, a blade and cover assembly 13, and a tray 14. This apparatus 10 finds particular utility as a saw for "dry cutting" masonry, but it may serve the same or similar function in a variety of other dry cutting as well as. wet cutting applications.

The frame 11 is an open structure that allows cuttings and debris to drop to a supporting surface so that they do not accumulate in the apparatus. It includes first and second side members 15 and 16 cast or otherwise formed of aluminum or any other suitable material of high strength and rigidity. These side members have substantially the same size and shape; they have an overall L-shaped configuration; and they define bores for receiving end portions of cross-members of the frame 11, as described below.

First, second and third cross-members 17, 18 and 19, respectively, extend between the first and second side members perpendicularly of the side members. They are round tubes made of aluminum or any other light weight material of high strength and rigidity. They have substantially the same length to place the first side member in parallel relation with the second side member.

Figure 6:
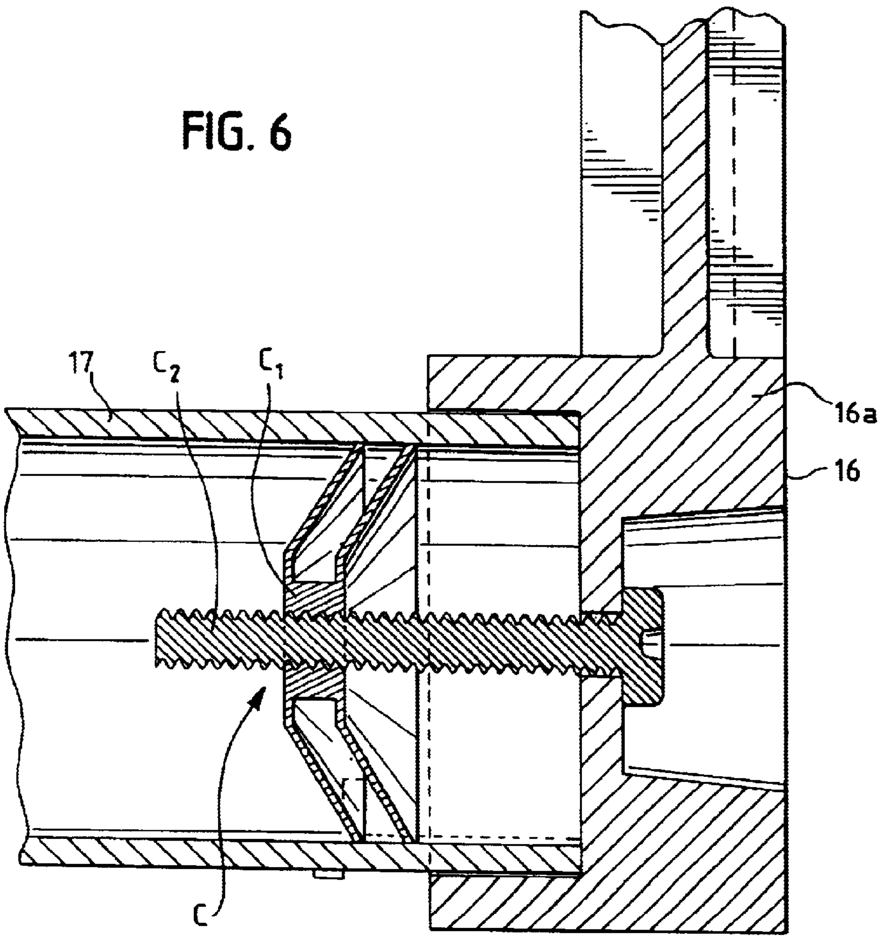
FIG. 6 is a sectional view taken along line 6—6 in FIG. 2.

Each of the side members 15 and 16 include a counterbore at the three locations where they receive end portions of the cross-members 17–19. At these locations (See FIG. 6), an end portion of a cross-member (e.g., cross-member 17) extends into one of the counterbores of a side member (e.g., side member 16). A tube connector C, which lies in the end portion of the cross-member, tightly secures the end portion to the side member by clamping the end portion against the walls of the counterbore.

This connector C includes a ram segment $C_1$ and a bolt $C_2$. When placed in the securing position shown in FIG. 6, the connector C lies in a cross-member where it allows turning of its bolt $C_2$ to move the ram segment $C_1$ inwardly of the counterbore (i.e., to the right in FIG. 6), increase the clamping force on the cross-member against the walls of the counterbore and provide a secure connection. (One example of a tube connector C is the Plastiglide Ram Connector manufactured by ITW of Waterbury, Conn.) The first and second cross-members 17 and 18 along with the larger of the two leg portions 15*a* and 16*a* of each of the first and second side members 15 and 16 (the horizontal portions 15*a* and 16*a*) cooperate to form the base of the apparatus 10. Similarly, the second and third cross-members 18 and 19 and the smaller of the two leg portions 15*b* and 16*b* of each of the first and second side members 15 and 16 (the vertical portions 15*b* and 16*b*) cooperate to form a raised cross bar arrangement for supporting the motor 12 and blade assembly 13 above the tray 14.

A cantilever member 20 lies secured at one end to the third cross-member 19 at the mid-section of the cross-member 19, offset from the mid-point of the member 19 a predetermined distance . The cantilever member 20 supports the motor 12 and the blade assembly 13 at its free, opposite end where an operator has an unobstructed view of the blade assembly and where the combination of these elements provides a center of gravity that facilitates the operation and transport of the apparatus 10. It is an articulated member with a spring 20*s* (e.g., a torsion spring, See FIGS. 10 and 11) which biases the larger of two segments 20*a* and 20*b*, the segment 20*a*, to a raised position shown in the drawings. The spring 20*s* counters the weight of the segment 20*a* and assists an operator in the cutting process by moving the blade assembly away from a cutting position when an operator releases the segment 20*a*. The smaller of the two segments, the segment 20*b*, remains stationary in the position shown.

Figure 4:
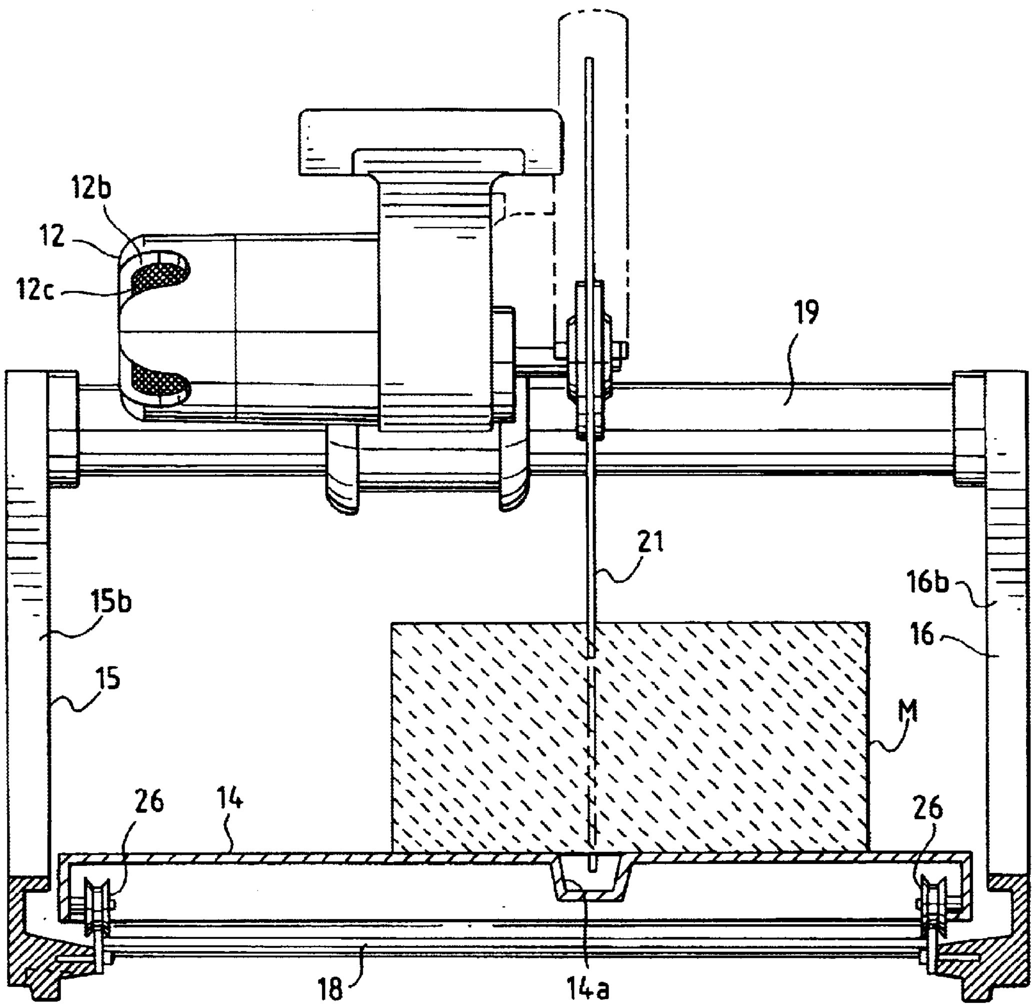
FIG. 4 is a sectional view taken along line 4—4 in FIG. 3.

At the free, opposite end of the cantilever member 20 (i.e., at the free end of the segment 20*a*), a handle portion 20*c* (that forms that end) allows an operator to grasp the segment 20*a* and pivot it downwardly about a pivot 20*d* that connects the two segments 20*a* and 20*b* together. In this manner one may bring the blade assembly 13 into cutting position, as shown in phantom lines in FIG. 4. Stops (not shown) on the segments 20*a* and 20*b* limit the range of pivoting motion of the segment 20*a* so that the cutting blade of the assembly 13, described below, does not strike the tray 14 or cut it.

Figure 8:
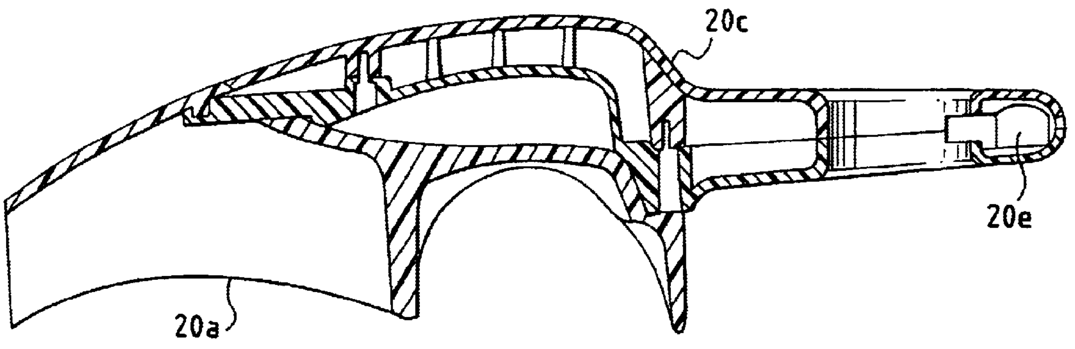
FIG. 8 is a sectional view of a handle for the cutting apparatus of the present invention.
Figure 9:
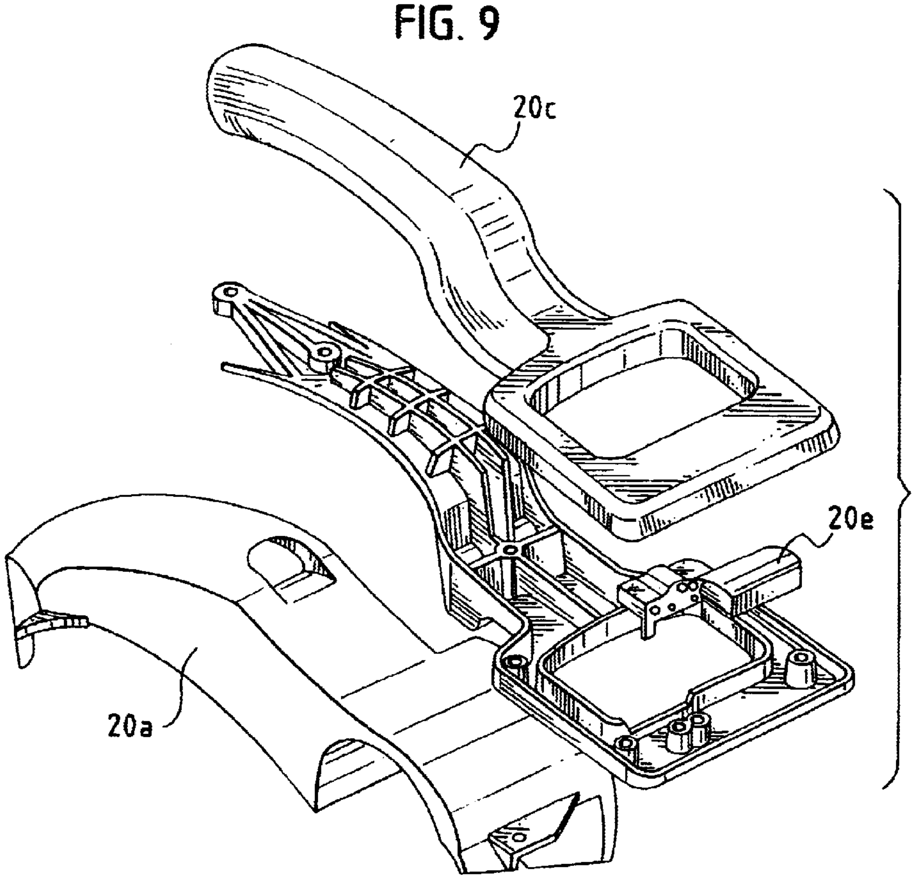
FIG. 9 is an exploded perspective view of the handle.

The handle portion 20*c* comprises upper and lower halves joined together and secured to the remaining portion of the cantilever segment 20*a* as shown in FIGS. 8 and 9. These halves are made of plastic or any other material of high strength and rigidity. They support a trigger 20*e* with which one may activate the motor 12. Control means (not shown) connect the trigger 20*e* with the motor 12.

As stated above, the cantilever member 20 supports the motor 12 which lies secured along one side of the segment 20*a*. The motor has a housing 12*a* with openings 12*b* that ventilate the inside of the housing. A filter 12*c* (e.g., an open cell foam material made of polyurethane ester) lies inside the housing 12*a* and filters the dust out of the air flowing through the openings 12*b*, without restricting the flow of air to the motor, to minimize the wear on the motor.

The motor's axle extends through the segment 20*a* to the opposite side of the segment 20*a*. There the axle supports and drives a cutting blade 21 of the assembly 13. This blade may be any suitable, conventional diamond or abrasive blade. A blade guard 22 of the assembly 13 lies secured to the cantilever segment 20*a* and extends over the top portion of the blade 21 to guard it and to protect the operator from the blade when the blade rotates.

Figure 5:
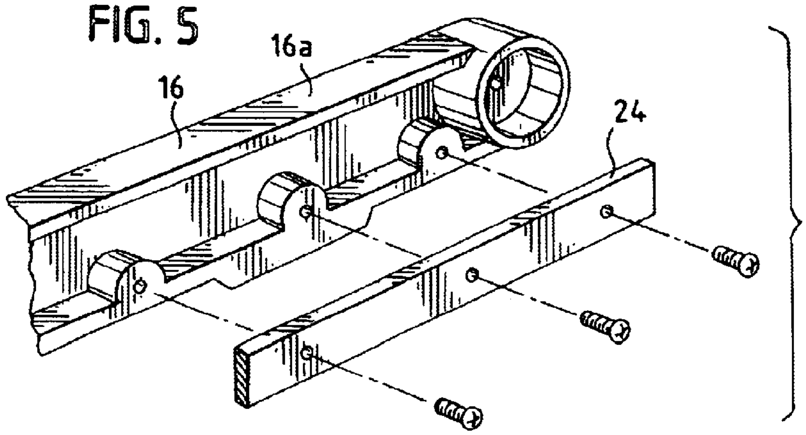
FIG. 5 is a partial and exploded perspective view of a side member of the apparatus frame and rail that helps support and guide the tray of the apparatus.

Rail segments 23 and 24 (See FIGS. 3–5) lie secured to the horizontal segments 15*a* and 16*b* of the side members 15 and 16, respectively, as shown in FIG. 5. These rail segments 23 and 24 are made of steel or any other material of high strength and rigidity; and they support and guide the tray 14 along a predetermined cutting path, as shown in FIG. 3. The precise parallel relationship of the side members 15 and 16 established by those members and the cross-members 17, 18 and 19 provides a precise path for the tray 14.

Figure 7:
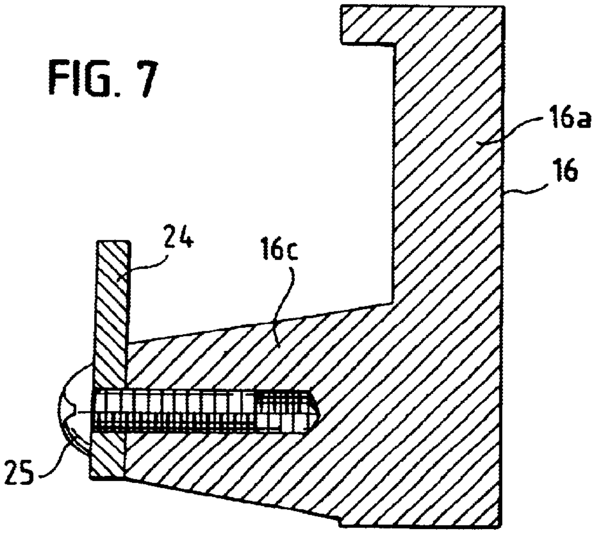
FIG. 7 is a sectional vie taken along line 7—7 in FIG. 3.

The side members 15 and 16 have a channel-like configuration in cross-section (See FIG. 4); and the horizontal portions 15*a* and 16*a* of those members include protrusions or bosses 15*c* and 16*c* that support the rail segments 23 and 24 and receive bolts 25 that secure the rail segments as shown in FIG. 7. In this position, the rail segments provide an unobstructed path for the tray member 14. They provide a path that lies a predetermined distance below the top surfaces of the horizontal portions 15*a* and 16*a* of the side members 15 and 16. This recessed positioning of the rail segments and thus the tray provides stability for the apparatus 10.

The tray 14 has a generally rectangular configuration; and it is made of metal, hard plastic, or any suitable material of high strength and rigidity. It defines a groove 14*a* into which the blade 21 extends so that it may clear an object M (e.g., a piece of masonry) that the apparatus 10 cuts. The tray 14 includes rollers 26 rotatably mounted to the main body 14*a* of the tray. These rollers 26 have a pulley-like configuration; and they ride or roll on the rail segments 23 and 24.

When cutting an object M, an operator places the object on the tray 14, grasps the handle portion 20*c* of the cantilever member 20, activates the motor 12 with the trigger 20*e*, and lowers the blade down to a cutting position. In this position, a spring loaded pin 27 mounted on the cantilever segment 20*b* moves into an opening 28 in the segment 20*a* and locks the blade in the cutting position (See FIGS. 12 and 13). The operator may then move the tray 14 forward past the blade to cut an object M. Alternatively, the apparatus 10 may include more than one opening 28 so that the apparatus may include more than one fixed cutting position.

The process for forming the frame 11 includes casting the side members 15 and 16 out of a material such as aluminum, fly cutting the end faces of the protrusions 15*c* and 16 that the rail segments 23 and 24 engage and drilling and tapping the holes that receive the bolts 25. The next step involves securing the rail segments 23 and 24 to the side members 15 and 16 respectively, and doing so while the side member castings are "green", i.e., before the castings have hardened to their final state. The rigid rail segments keep the side members straight and prevent them from warping during hardening. One then counterbores the openings that receive the cross-members in the side members 15 and 16. The counterboring provides a precise diameter for the openings and a flat bottom, facilitating a secure and precise connection. The next series of steps comprise cutting three cross-member tubes (e.g., extruded aluminum tubes) to the same length, inserting ram segments $C_1$ in the end portions of the tubes with a press, and securing the cantilever member 20 to the cross-member with a jig and the motor and blade assembly to the cantilever member. One may then insert the end portions of the cross-members into a pressed fit in the counterbored openings using a press, and tightening the bolts $C_2$.

By way of a specific example, a portable cutting apparatus of the present invention was constructed using extruded aluminum tubes as cross-members having an acid etched, clear anodized finish and a length of 20.000 inches±0.005, a diameter of 2.0 inches and a wall thickness of 0.125 inches. The horizontal dimension between the centers of the cross-members 17 and 18 (or the corresponding counterbores) was 28.000 inches; and the vertical dimension between the centers of the cross-members 18 and 19 (or the corresponding counterbores) was 11.000 inches. The distance between the end of the member 19 (i.e., the end that extends into the side member 15) and the center of the cantilever segment 20*b* was 8.250 inches; and the distance between the center of the cantilever segment 20*b* and the other end of the cross-member 19 was 11.750 inches. The distance between the center of the cross-member 19 and the center of the pivot 20*d* was 2.750; and the distance between the center of the pivot 20*d* and the center of the motor's shaft or axle was 12.000. The segment 20*b* of the cantilever member 20 was mounted at a 30° angle from the horizontal; and the segment 20*a* had a 50° range of motion from 30° above to 20° below the horizontal. The depth of the counterbores was 0.625 inches; the distance from the bottom of the counterbores to the outer surface of the corresponding bosses of each side member was 1.000 inches; and the distance between the inside surfaces of the rail segments 23 and 24 was 17.75 inches. The rail segments were made of zinc plated, cold-rolled steel having a thickness of 11 gauge and a height of 0.75 inches. Finally, the motor was a 115 volt, 13 amp and 3,500 rpm double-insulated motor.

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A method of forming a portable cutting apparatus including a frame and cutting assembly, the frame including a first and second side member, and a plurality of cross-members, the method comprising the steps of:

(a) forming each of the first and second side members as elongated members having an integral one-piece generally L-shaped configuration with a channel therein and a plurality of Protrusions located alone an interior Portion of each side member, wherein the Protrusions are machined to form rail-receiving surfaces;

(b) forming the plurality of cross-members with substantially the same length;

(c) forming openings having a predetermined depth in the side members, each side member having an opening for receiving each cross-member such that each of the openings are located near at least a first end and a second end of the first and second side members;

(d) inserting opposite end portions of each cross-member by press fit into corresponding openings in the side members to connect the side members and the cross-members together to form the frame, the cross-members being disposed in substantially parallel relation with each other and substantially perpendicular relation with the side members; and (e) securing the cutting assembly to the frame.

2. The method of claim 1, wherein a rail segment is secured to the protrusions of a side member, the rail segment engaging a surface of each protrusion and assuring that the side member hardens into a substantially straight member.

3. The method of claim 1, wherein the openings in the side members are counterbored into the side members.

4. The method of claim 1, wherein the cross-members are tubular and the method further comprises providing tube connectors to further secure the end portions of the cross-members to the side members.

5. The method of claim 1, further comprising the step of securing a cantilever member to one of the cross-members before connecting the cross-members to the side members.

* * * * *